Aug. 28, 1923.

DE VAN WHEELER 1,466,218

EXTENSION GRATE FOR THRASHING MACHINES

Filed April 3, 1922     2 Sheets-Sheet 1

Inventor
De Van Wheeler

By *Bealer Park*

Attorney

Patented Aug. 28, 1923.

1,466,218

UNITED STATES PATENT OFFICE.

DE VAN WHEELER, OF ROCA, NEBRASKA.

EXTENSION GRATE FOR THRASHING MACHINES.

Application filed April 3, 1922. Serial No. 549,099.

*To all whom it may concern:*

Be it known that I, DE VAN WHEELER, a citizen of the United States, residing at Roca, in the county of Lancaster and State of Nebraska, have invented certain new and useful Improvements in Extension Grates for Thrashing Machines; and I hereby declare that the following is a full, clear, and exact description thereof, reference being had to the accompanying drawings, which form part of the specification.

My invention relates to extension grates for thrashing machines.

The object of my invention is to provide a novel form of grate of this class adapted for ready attachment to a thrashing machine of the cylinder and concave type in which the grate is provided with means for shunting any particles of broken straw from access to the grain pan and guiding it to the straw carrier. It is also my object to provide a grate bar designed to more effectively intercept the grain carried past the concave and direct it to the grain pan.

Figure 1:
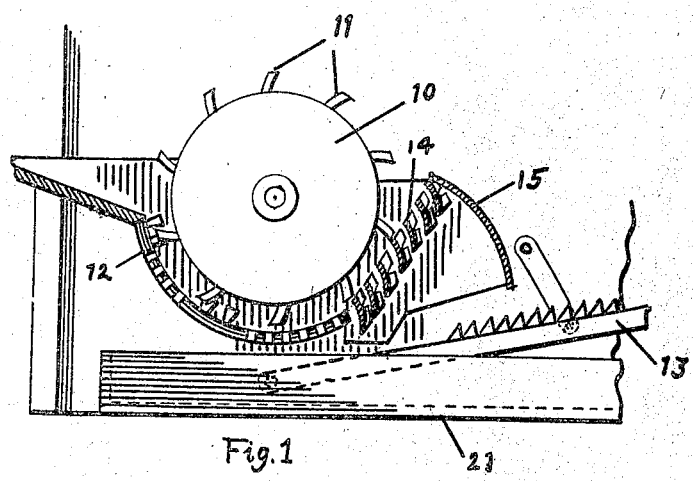
Figure 2:
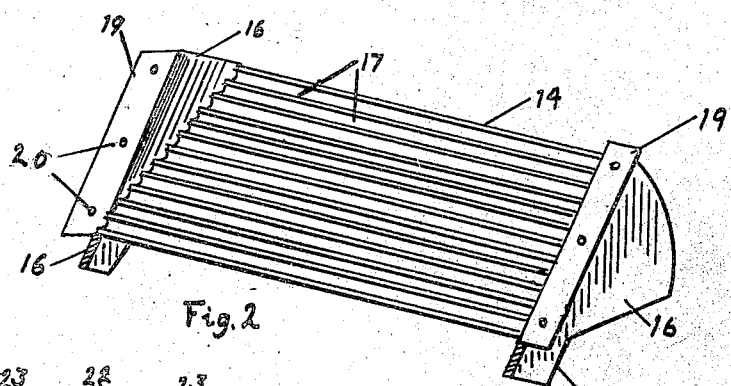
Figure 3:
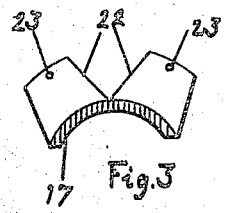
Figure 4:
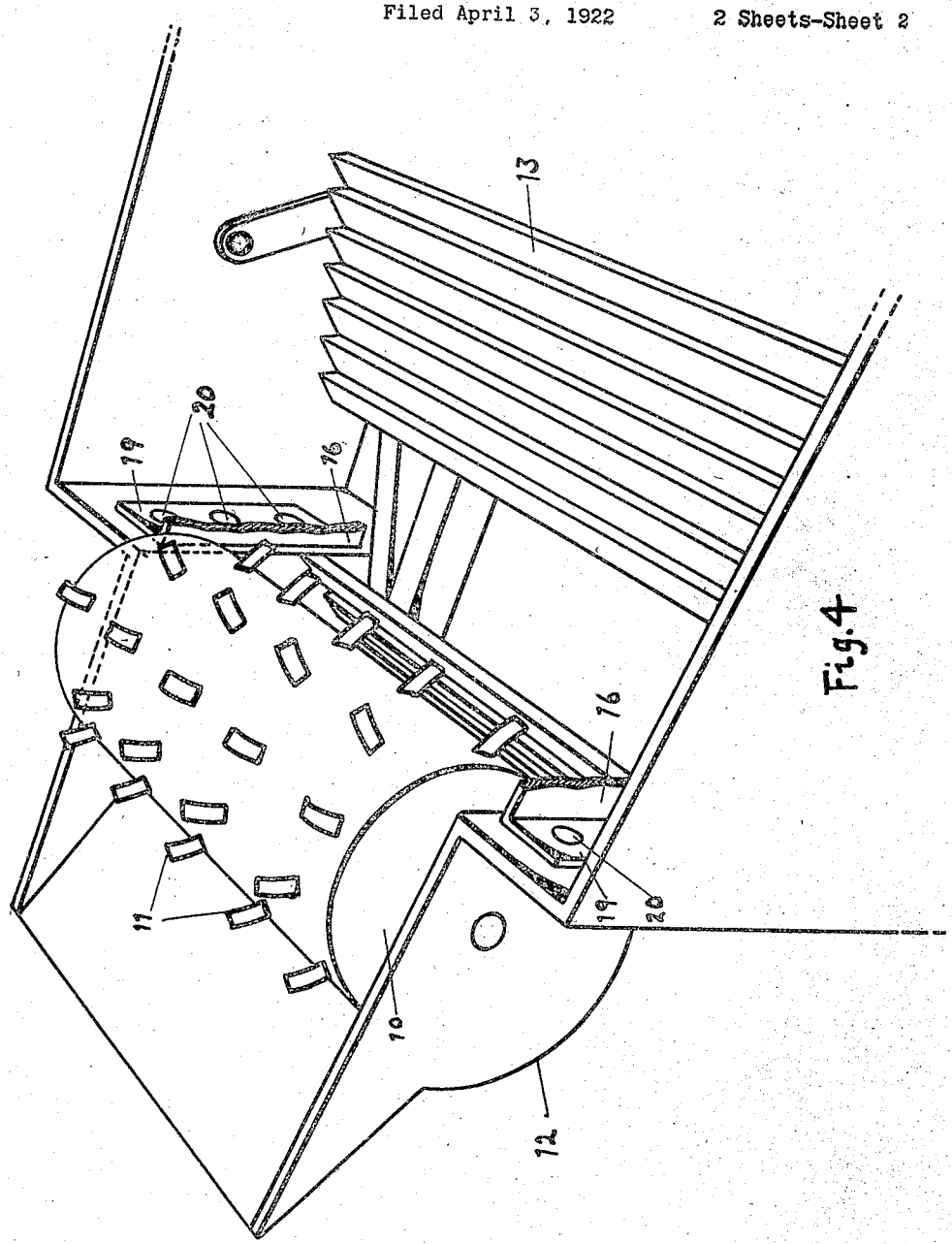

In the accompanying drawing Fig. 1 is a side elevation partly in section showing the conventional type of cylinder and concave and having my extension grate attached in rear of the concave. Fig. 2 is a perspective view of my extension grate detached and Fig. 3 is a cross section of one of the grate bars. Fig. 4 is a perspective view partly broken away to show how the flanges of my device are bolted to the thrashing machine.

Referring to the drawings 10 denotes the cylinder having curvilinear teeth 11; 12 the concave and 13 the straw carrier. 14 denotes my extension grate having rigidly bolted to its rear end an arc shaped shield 15 the sides of which are sector shaped and have bolted thereto and therebetween grate bars 17. 18 denotes triangular downward extensions formed integral with sides 16 and having flanges 19 bent outwardly at right angles to the sides provided with bolt holes 20 which serve for attaching the extension grate to the frame-work of the thrasher. As shown in Fig. 3 the grate bars are slightly curvilinear in shape at their upper edges and conform to the curve of the cylinder teeth 11. The body of said grate bars extend downwardly in approximately direct lines toward the grate pan 21 directing the fall of grain thereto. The ends 23 of the grate bars are forked, the prongs 22 having bolt holes therein for bolting the bars at each end to the sides 16.

In operation the series of grate bars serve to intercept the grain which has been carried past the concave and directs the fall of such grain to the grain pan 21. The shield 15 serves as a bridge between the upper end of my extension grate and straw carrier and serves to convey the broken straw and chaff directly to the straw carrier and prevent its entry to the grate pan. By curving the edges of the grate bars to conform with the curve of the cylinder teeth I am enabled to more effectively intercept the grain carried by the concave.

Claims—

1. An extension grate having a series of grate bars, side walls rigidly secured to said bars and provided with outwardly projecting flanges facing forward adapted for attachment to the interior frame work of a thrashing machine, and an arc-shaped shield positioned rearwardly of said bars and adapted to clamp the rear portion of said side walls.

2. An extension grate for thrashing machines having a series of curvilinear grate bars the end of which are flanged, a rigid arc-shaped shield, and rigid sector shaped sides for said shield, said bars being fastened to the inner face of said sides and said shield fastened to outer face of said sides.

In testimony that I claim the foregoing as my own, I affix my signature.

DE VAN WHEELER.